Aug. 16, 1927.
J. C. ERICKSON
1,639,402
MOTOR MOUNTING FOR CORN HARVESTERS
Filed Nov. 25, 1925
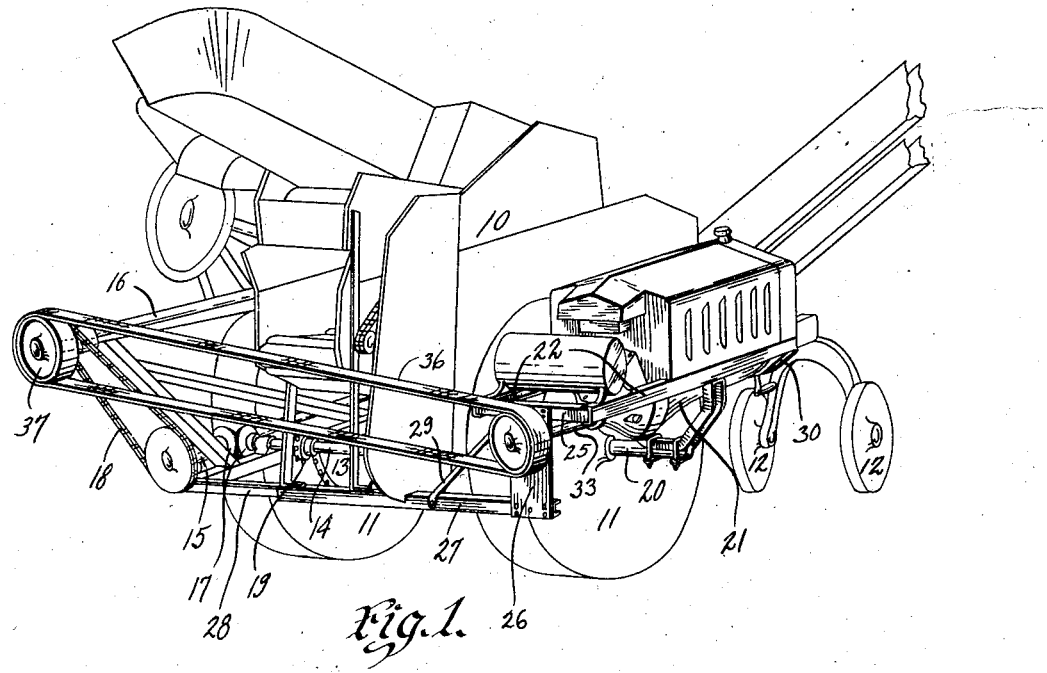
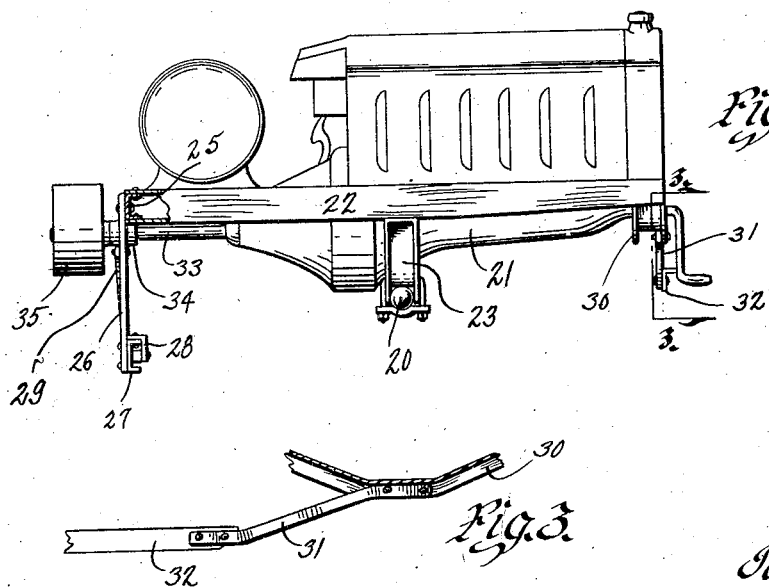
Witness
Inventor
John C. Erickson
by Bair & Freeman Attorneys Patented Aug. 16, 1927.

1,639,402

UNITED STATES PATENT OFFICE.

JOHN C. ERICKSON, OF MARATHON, IOWA.

MOTOR MOUNTING FOR CORN HARVESTERS.

Application filed November 25, 1925. Serial No. 71,377.

The object of my invention is to provide a motor mounting for corn harvesters of simple, durable and comparatively inexpensive construction.

A further object is to provide a motor mounting which can readily and easily be attached to a corn harvester so that a motor thereon may drive the snapping, husking and elevating mechanism of the harvester, so that this driving will not have to be done by the horses or tractor pulling the harvester through the medium of the rear wheels.

Still a further object is to provide novel and efficient means for attaching the mounting to the harvester in a position where it will not interfere with any of the working parts thereof, and will not knock corn down.

With these and other objects in view, my invention consists in the construction, arrangement and combination of the various parts of my motor mounting for corn harvesters, whereby the objects contemplated are attained, as hereinafter more fully set forth, pointed out in my claims, and illustrated in the accompanying drawings, in which:

Figure 1, is a perspective view of a harvester showing my motor mounting attached thereto and a motor on the mounting.

Figure 2 is a side elevation of the motor and the mounting.

Figure 3, is a detail view of one of the attaching members on the line 3—3 of Figure 1.

On the accompanying drawing I have used the reference numeral 10 to indicate generally a corn harvester which is supported on rear wheels 11 and front wheels 12. On the rear wheel 11 is drive sprocket 13. The mechanism of the harvester is driven through shafts 14 and 15 and a chain 18.

When the harvester is used without a motor, a chain extends from the sprocket 13 to a sprocket 19 on the shaft 14 for driving the harvester mechanism from the wheels 11. When my motor and my motor mounting are used, this driving chain is taken off so that there is no operative connection between the wheels 11 and the harvester mechanism.

The wheels 11 rotate on a stationary shaft on the harvester 10. I remove this shaft and insert a longer one 20 for supporting the motor 21.

The motor 21 is mounted on longitudinal frame members 22 to which is affixed a U shaped supporting channel 23. The channel 23 is clamped to the outwardly extending end of the shaft 20 by means of U bolts 24.

The rear ends of the frame members 22 are connected by a cross member 25.

Secured to the cross member 25 is a plate 26, the lower end of which is secured to a supporting bar 27. The bar 27 is bolted to an angle 28 which forms part of the harvester frame. A brace 29 extends from the plate 26 to the bar 27.

The front frame member 30 is braced by a brace 31 extending to an angle 32 which is also a part of the harvester frame.

The drive shaft 33 extends back from the engine 21 and through a bearing 34 on the plate 26. A pulley 35 is mounted on the end of the shaft 33.

The motor 21 is operatively connected to the harvester mechanism by means of a belt 36, extending from the pulley 35 to a pulley 37 which is secured to the end of the shaft 16.

Thus it will be seen that I have provided a motor mounting for corn harvesters which can be easily attached thereto in an out of the way position and still at a point advantageous for the transmission of power from the motor 21 to the harvester mechanism.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A motor mounting for corn harvesters comprizing a frame for supporting the motor, a downwardly opening channel shaped supporting member extending downward therefrom and clamped to the rear axle of the harvester.

2. A motor mounting for corn harvesters comprizing a frame for supporting the motor, a downwardly opening channel shaped supporting member extending downward therefrom and receiving the rear axle of the harvester, clamps for securing said supporting member to said axle, a supporting bar affixed to the rear end of said frame and to the frame of said harvester for preventing pivotal movement of said mounting about said rear axle.

3. A motor mounting for corn harvesters comprizing a frame for supporting the motor, a downwardly opening channel shaped supporting member extending downward therefrom and receiving the rear axle of the harvester, clamps for securing said supporting member to said axle, a supporting bar affixed to the rear end of said frame and to the frame of said harvester for preventing pivotal movement of said mounting about said rear axle, a motor on said mounting and means for transmitting power from the motor to the working mechanism of the harvester.

4. In a device of the class described, the combination of a harvesting machine, having a frame, an axle supported on the frame, wheels mounted on the axle, said axle projecting beyond the wheels at one side of the machine, a power unit, a frame for supporting said power unit at the side of the first frame, a member for supporting the second frame on the projected end of the axle, a member supported on said frame, said power unit having an axle journaled in said member and another member connected with said first-described member and the second frame and rigidly connected with the first frame.

Des Moines, Iowa, November 17, 1925.

JOHN C. ERICKSON.